US010472246B2

(12) United States Patent
Yoshizaki (10) Patent No.: US 10,472,246 B2
(45) Date of Patent: Nov. 12, 2019

(54) METHOD AND APPARATUS FOR PRODUCING SODIUM BOROHYDRIDE

(71) Applicant: Hydric Power Systems Co., Ltd., Kashiwa-shi, Chiba (JP)

(72) Inventor: Atsuhiro Yoshizaki, Kashiwa (JP)

(73) Assignee: HYDRIC POWER SYSTEMS CO., LTD., Kashiwa-shi, Chiba (JP)

( * ) Notice: Subject to any disclaimer, the term of this patent is extended or adjusted under 35 U.S.C. 154(b) by 0 days.

(21) Appl. No.: 15/313,875

(22) PCT Filed: Jun. 5, 2015

(86) PCT No.: PCT/JP2015/066292
§ 371 (c)(1),
(2) Date: Nov. 23, 2016

(87) PCT Pub. No.: WO2015/190403
PCT Pub. Date: Dec. 17, 2015

(65) Prior Publication Data
US 2017/0183236 A1    Jun. 29, 2017

Related U.S. Application Data

(63) Continuation of application No. PCT/JP2014/066487, filed on Jun. 11, 2014.

(51) Int. Cl.
*C01B 6/21*        (2006.01)
*C01B 35/02*       (2006.01)
(Continued)

(52) U.S. Cl.
CPC ............ *C01B 35/02* (2013.01); *B01J 8/0015* (2013.01); *B01J 8/085* (2013.01); *B01J 8/10* (2013.01);
(Continued)

(58) Field of Classification Search
CPC .. C01B 6/21; C01B 3/04; C01B 35/02; C01B 3/001; B01J 2208/00752; B01J 8/0015; B01J 8/085; B01J 8/10
See application file for complete search history.

(56) References Cited

U.S. PATENT DOCUMENTS

| 1,331,904 A | * | 2/1920 | Elder | ............. B01J 23/70 |
| | | | | 122/11 |
| 3,379,511 A | | 4/1968 | Knorre | ............. 23/361 |

(Continued)

FOREIGN PATENT DOCUMENTS

| CN | 1683242 A | 10/2005 |
| CN | 101269793 A | 9/2008 |

(Continued)

OTHER PUBLICATIONS

Bin Hong Liu et al. "Sodium BorohydrideSynthesis by Reaction of Na2Ocontained Sodium Borate with Al and Hydrogen" Energy & Fuels, 2007,vol. 21, No. 3, p. 1707-1711.

*Primary Examiner* — Amber R Orlando
*Assistant Examiner* — Syed T Iqbal
(74) *Attorney, Agent, or Firm* — Hauptman Ham, LLP (57) ABSTRACT

A method and an apparatus for producing sodium borohydride that have excellent energy efficiency and production efficiency are provided. Using a production apparatus 20 comprising: a cylindrical reaction container 21; a cylindrical reaction portion 22 which is rotatably held in this reaction container 21 and in which sodium metaborate that is a raw material 1 and granular aluminum are housed together with a grinding medium 2; and a hydrogen introduction portion 23 for introducing hydrogen gas into the reaction portion 22 directly or via the reaction container 21, the sodium metaborate and the granular aluminum are reacted under a hydrogen atmosphere, while being rolled and ground with the grinding medium, to obtain sodium borohydride.

7 Claims, 4 Drawing Sheets

(51) Int. Cl.
  *C01B 3/00* (2006.01)
  *B01J 8/00* (2006.01)
  *B01J 8/08* (2006.01)
  *B01J 8/10* (2006.01)
(52) U.S. Cl.
  CPC ............... *C01B 3/00* (2013.01); *C01B 3/001* (2013.01); *C01B 6/21* (2013.01); *B01J 2208/00752* (2013.01); *Y02E 60/327* (2013.01)

(56) References Cited

U.S. PATENT DOCUMENTS

| | | | |
|---|---|---|---|
| 6,440,385 B1* | 8/2002 | Chaklader | C01B 3/08 423/657 |
| 7,429,368 B2 | 9/2008 | Zhou | 423/286 |
| 8,377,405 B2 | 2/2013 | Chin et al. | 423/288 |
| 2004/0249215 A1* | 12/2004 | Suda | C01B 6/21 568/1 |
| 2006/0078486 A1 | 4/2006 | Chin et al. | 423/288 |
| 2006/0106195 A1 | 5/2006 | Kong | 528/394 |
| 2006/0127304 A1* | 6/2006 | Fujii | B01J 20/04 423/644 |
| 2014/0073822 A1* | 3/2014 | Wei | C10G 1/02 585/16 |

FOREIGN PATENT DOCUMENTS

| | | |
|---|---|---|
| EP | 1 424 310 A2 | 6/2004 |
| EP | 1 645 644 A2 | 4/2006 |
| EP | 1 586 536 A2 | 10/2015 |
| JP | 2002-193604 A | 7/2002 |
| JP | 2004-224684 A | 8/2004 |
| JP | 2005-97047 A | 4/2005 |
| JP | 2006-104055 A | 4/2006 |
| JP | 2006-143537 A | 6/2006 |
| KR | 10-2014-0002216 A | 1/2014 |
| WO | WO 01/71089 A2 | 9/2001 |

* cited by examiner

METHOD AND APPARATUS FOR PRODUCING SODIUM BOROHYDRIDE

CROSS-REFERENCE TO RELATED APPLICATIONS

This application is a national stage of International Application No. PCT/JP2015/066292, filed Jun. 5, 2015, which claims the benefit of priority to International Application No. PCT/JP2014/066487, filed Jun. 11, 2014, in the Japanese Patent Office, the disclosures of which are incorporated herein in their entireties by reference.

TECHNICAL FIELD

The present invention relates to a method and an apparatus for producing sodium borohydride. More particularly, the present invention relates to a method and an apparatus for producing sodium borohydride from sodium metaborate.

BACKGROUND ART

Borohydride compounds have a high hydrogen storage rate and can easily generate hydrogen by reacting with water under normal temperature and normal pressure and therefore attract attention as hydrogen carriers for fuel cells. For example, in the case of sodium borohydride ($NaBH_4$), 10.8% by mass of hydrogen can be removed by the hydrolysis reaction represented by the following chemical formula 1. In this manner, sodium borohydride containing hydrogen at high density can be an excellent hydrogen carrier.

$NaBH_4+2H_2O \rightarrow 4H_2+NaBO_2$ [Chem. 1]

Methods for industrially producing sodium borohydride include a method of heating sodium tetraborate ($Na_2B_4O_7$) obtained by purifying borax, metal sodium, and silicon oxide to 400 to 450° C. under a pressurized hydrogen atmosphere to allow the reaction represented by the following chemical formula 2 to proceed. However, a problem of this method is that the cost of the purification of borax that is a raw material is high, and expensive metal sodium is used, and therefore the production cost increases.

$Na_2B_4O_7+16Na+8H_2+7SiO_2 \rightarrow 4NaBH_4+7Na_2SiO_3$ [Chem. 2]

In addition, it is reported that sodium borohydride can also be produced by reacting sodium diborate ($Na_4B_2O_5$) or a mixture of sodium diborate, sodium metaborate ($NaBO_2$), and sodium oxide ($Na_2O$) with aluminum (Al) and hydrogen ($H_2$) as shown in the following chemical formula 3 and chemical formula 4 (see Non Patent Literature 1). In the reactions represented by the following chemical formulas 3 and 4, aluminum more inexpensive than sodium is used, but $Na_4B_2O_5$ and $NaBO_2$ that are raw materials are expensive, and therefore, as in the above-described method, a problem is that the production cost increases.

$4Al+6H_2+2Na_4B_2O_5 \rightarrow 3NaBH_4+4NaAlO_2+NaBO_2$ [Chem. 3]

$4Al+6H_2+Na_4B_2O_5+NaBO_2+Na_2O \rightarrow 3NaBH_4+4NaAlO_2$ [Chem. 4]

Therefore, conventionally, a method for producing a borohydride compound by the reaction represented by the following chemical formula 5 using sodium metaborate ($NaBO_2$) produced by hydrolysis and a metal hydride such as magnesium hydride ($MgH_2$) is proposed (for example, see Patent Literature 1).

$NaBO_2+2MgH_2 \rightarrow NaBH_4+2MgO$ [Chem. 5]

In addition, a method of heating a mixture comprising a borate and an alkaline earth metal such as magnesium to, for example, 550° C., under a pressurized hydrogen atmosphere to obtain sodium borohydride by the reaction represented by the following chemical formula 6 is also proposed (for example, see Patent Literature 2). In the method described in Patent Literature 2, by performing heating at a pressure lower than reaction equilibrium pressure at which a hydride of magnesium is stably present to produce protide ($H^-$) on the surface of magnesium, an exchange reaction with an oxide ion ($O^{2-}$) in sodium metaborate is promoted for yield improvement.

$NaBO_2+2Mg+2H_2 \rightarrow NaBH_4+2MgO$ [Chem. 6]

In the methods described in Patent Literatures 1 and 2 described above, the reaction is performed using a batch type apparatus, but an apparatus that continuously performs the reaction represented by the above chemical formula 3 is also proposed (see Patent Literature 3). The apparatus described in Patent Literature 3 has a configuration in which a mixture comprising a borate and an alkaline earth metal is supplied into a heated cylinder together with pressurized hydrogen gas, and these are kneaded by a screw blade while being transferred, to allow a reaction to proceed to produce a tetrahydroborate.

CITATION LIST

Patent Literature

Patent Literature 1: Japanese Patent Application Publication No. 2002-193604
Patent Literature 2: Japanese Patent Application Publication No. 2004-224684
Patent Literature 3: Japanese Patent Application Publication No. 2005-97047

Non Patent Literature

Non Patent Literature 1: Bin Hong LIU and four others, "Sodium Borohydride Synthesis by Reaction of Na2O contained Sodium Borate with Al and Hydrogen", Energy & Fuels, 2007, Vol. 21, No. 3, p. 1707-1711

SUMMARY OF INVENTION

Technical Problem

If sodium metaborate that is a by-product of the hydrolysis reaction represented by the above chemical formula 1 and remains after hydrogen is removed can be regenerated into sodium borohydride, not only a reduction in production cost, but a recyclable hydrogen carrier can be realized. However, a problem of all the conventional methods and apparatuses for producing sodium borohydride as described in Patent Literatures 1 to 3 described above is that it is necessary to perform the reaction at high temperature, and the energy efficiency during the production is low.

For example, in the method described in Patent Literature 1, magnesium is hydrogenated under high temperature and high pressure as the first-stage reaction, and the obtained magnesium hydride is reacted with sodium metaborate under the condition of a high temperature, 550° C., in the second-stage reaction. In addition, in the method in Patent Literature 2, an oxide (MgO) layer forms on the surface of magnesium in the reaction process, and MgO inhibits the reducing action of magnesium and therefore is a factor that inhibits the sodium borohydride production reaction. Therefore, in Patent Literature 2, it is described that in order to promote the sodium borohydride production reaction under the conditions in which the oxide layer is formed on the surface of magnesium, it is necessary to perform the reaction in an environment of a high temperature and a high pressure, 500 to 550° C. and 10 to 20 MPa. Also when the apparatus described in Patent Literature 3 is used, similarly, it is necessary to heat the inside of the cylinder to 500 to 600° C.

In addition, in the techniques described in Patent Literatures 1 to 3, magnesium is used as a reducing agent, but the amount of magnesium, metal resources, distributed is small, and therefore in order to mass-produce sodium borohydride by these methods, it is necessary to return magnesium oxide (MgO) that is a by-product and has a low utility value to metal magnesium (Mg) for reuse. However, in order to obtain metal magnesium, magnesium oxide must be heated and decomposed at a temperature of about 4000° C., and more energy is necessary.

Further, the method using a metal hydride such as $MgH_2$ has low production efficiency for the reasons that a metal and hydrogen must be previously reacted to produce a metal hydride, and the raw material must be excessively introduced during the reaction because the unreacted metal remains inside the metal hydride, and the like, and the method is not put to practical use.

Therefore, it is an object of the present invention to provide a method and an apparatus for producing sodium borohydride that have excellent energy efficiency and production efficiency.

Solution to Problem

A method for producing sodium borohydride according to the present invention is a method for producing sodium borohydride from sodium metaborate, comprising a step of reacting sodium metaborate and granular aluminum under a hydrogen atmosphere, while rolling and grinding the sodium metaborate and the granular aluminum using a grinding medium, to obtain sodium borohydride.

The step of obtaining sodium borohydride may be performed under conditions of normal temperature and normal pressure.

An apparatus for producing sodium borohydride according to the present invention is an apparatus for producing sodium borohydride from sodium metaborate, comprising a cylindrical reaction container; a cylindrical reaction portion which is rotatably held in the reaction container and in which sodium metaborate that is a raw material and granular aluminum are housed together with a grinding medium; and a hydrogen introduction portion for introducing hydrogen gas into the reaction portion directly or via the reaction container, and a hydrogenation reaction of the sodium metaborate is performed under a hydrogen atmosphere while the reaction portion is rotated to roll and grind the granular aluminum with the grinding medium.

This production apparatus may have a configuration in which a hole or a slit through which hydrogen gas can pass is formed in the reaction portion, and hydrogen gas introduced into the reaction container from the hydrogen introduction portion passes through the hole or the slit and is introduced into the reaction portion.

In addition, it is also possible to provide a raw material supply portion for supplying a raw material to the reaction portion, and a product recovery portion for recovering sodium borohydride and aluminum oxide produced in the reaction portion, and continuously produce the sodium borohydride.

Further, it is possible to comprise a dryer for drying a hydrate of sodium metaborate to obtain anhydrous sodium metaborate, and continuously supply anhydrous sodium metaborate obtained by drying with the dryer from the raw material supply portion into the reaction portion.

The "aluminum" in the present invention also includes, in addition to pure aluminum, aluminum alloys comprising various additive elements in a range that does not inhibit the reaction.

Advantageous Effects of Invention

According to the present invention, anhydrous sodium metaborate and granular aluminum are reacted under a hydrogen atmosphere while being rolled and ground using a grinding medium, and therefore sodium borohydride can be efficiently produced from sodium metaborate produced by the hydrolysis of sodium borohydride.

DESCRIPTION OF EMBODIMENTS

Modes for carrying out the present invention will be described in detail below with reference to the accompanying drawings. The present invention is not limited to the embodiments described below.

(First Embodiment)

Figure 1:
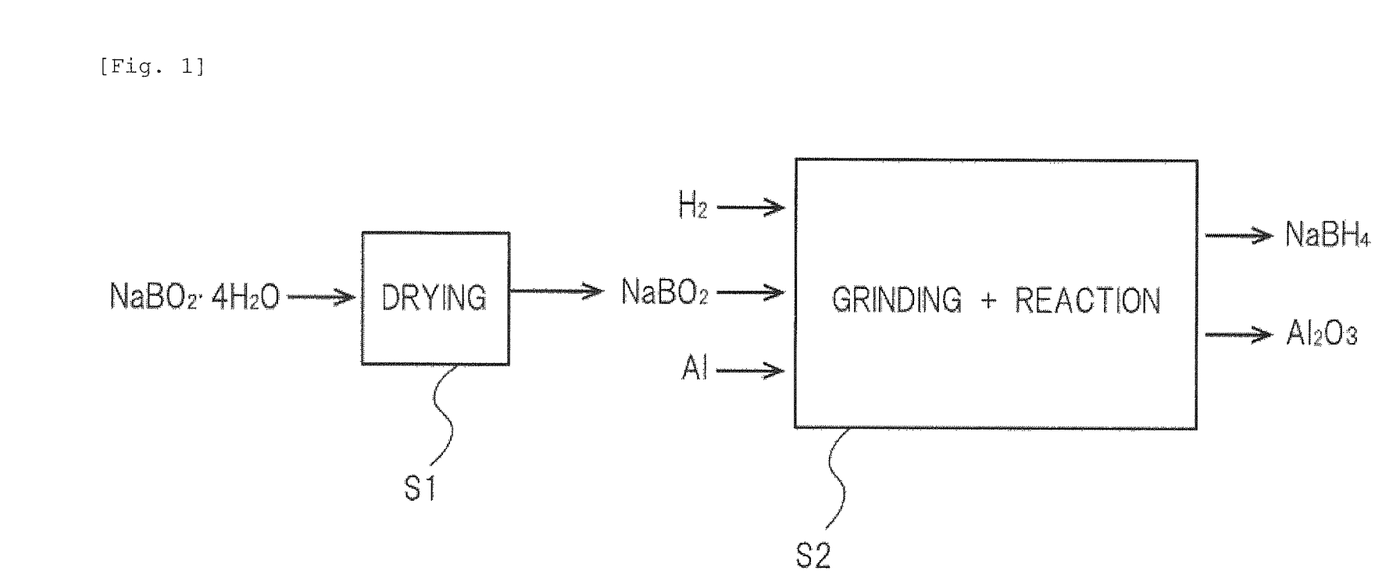
FIG. 1 is a conceptual diagram showing a method for producing sodium borohydride in the first embodiment of the present invention.

First, a method for producing sodium borohydride (NaBH4) according to the first embodiment of the present invention will be described. FIG. 1 is a conceptual diagram showing the method for producing $NaBH_4$ in this embodiment. As shown in FIG. 1, in this embodiment, a hydrogenation reaction is performed under a hydrogen atmosphere using sodium metaborate ($NaBO_2$) as a raw material and aluminum (Al) to produce sodium borohydride ($NaBH_4$).

In order to realize a recyclable hydrogen carrier, the present inventor has experimented and studied diligently for methods for efficiently producing sodium borohydride from sodium metaborate that remains after hydrogen is removed, and obtained the finding shown below. The production efficiency of sodium borohydride depends largely on the selection of an element having reducing action. The greatest advantage of magnesium used in the conventional methods described above is that oxygen is easily bonded to magnesium, and magnesium has strong reducing action. On the other hand, a reaction using magnesium has various problems as described above.

Therefore, the present inventor has paid attention to aluminum that has strong bonding force to oxygen like magnesium and has the same level of electronegativity.

When aluminum is used, sodium borohydride can be produced by the reaction represented by the following chemical formula 7. Aluminum is more inexpensive than alkaline earth metals such as magnesium, and therefore not only the improvement of energy efficiency and production efficiency, but it is also possible to reduce cost when sodium borohydride is produced from sodium metaborate.

$$4Al + 6H_2 + 3NaBO_2 = 3NaBH_4 + 2Al_2O_3 + 329 \text{ kJ} \quad \text{[Chem. 7]}$$

When sodium borohydride is produced by the reaction represented by the above chemical formula 7, for example, it is recommended that hydrogen ($H_2$) gas is supplied to a reaction container, and a mixture of sodium metaborate ($NaBO_2$) that is a raw material and aluminum (Al) is heated under a hydrogen atmosphere. However, in the above-described Non Patent Literature 1, it is described that the reaction represented by the above chemical formula 7 is thermodynamically possible, but actually, even if sodium metaborate, aluminum, and hydrogen are reacted, sodium borohydride cannot be produced.

Figure 2:
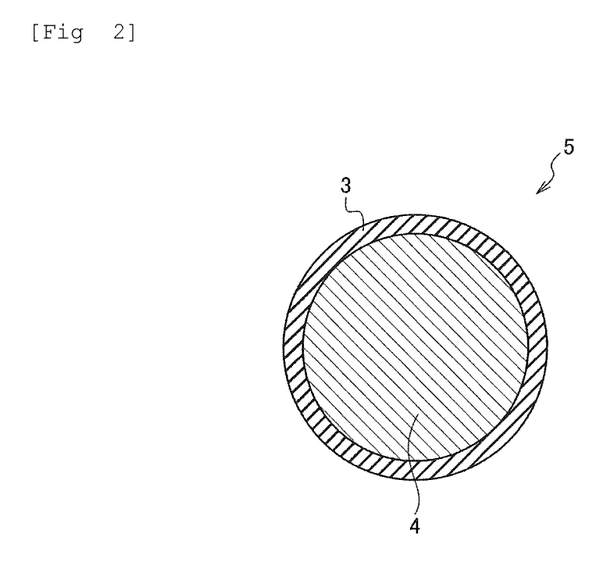
FIG. 2 is a diagram schematically showing the state of aluminum included in reaction products obtained by a conventional production method.

In this reaction, the fact that an oxide layer is formed in the reaction process so as to cover the aluminum surface is considered as a factor that inhibits the production of sodium borohydride. FIG. 2 is a diagram schematically showing the state of aluminum included in reaction products obtained by a conventional production method. As shown in FIG. 2, when sodium metaborate, aluminum, and hydrogen are reacted by the conventional production method, an aluminum oxide ($Al_2O_3$) layer 3 is formed on the surface of an aluminum powder 5, and unreacted aluminum (Al) 4 remains inside.

For example, when a reaction is performed using an aluminum powder having a particle diameter of 50 μm, and the conversion rate from sodium metaborate to sodium borohydride is 60%, the unreacted aluminum 4 is 40% by volume, the aluminum oxide layer 3 is 60% by volume, and the thickness of the aluminum oxide layer 3 is about 7 μm.

Therefore, the present inventor has studied methods for suppressing a decrease in production efficiency due to an oxide layer, found a method of performing reaction while rolling and grinding granular aluminum using a grinding medium, and arrived at the present invention.

In other words, in the method for producing sodium borohydride in this embodiment, the step of reacting sodium metaborate and granular aluminum under a hydrogen atmosphere, while rolling and grinding the sodium metaborate and the granular aluminum using a grinding medium, to obtain sodium borohydride (reaction step S2) is performed. In addition, in the production method in this embodiment, the step of drying a hydrate of sodium metaborate to obtain anhydrous sodium metaborate (drying step S1) may be performed, as needed, before the reaction step S2.

<Drying Step S1>

Sodium metaborate, particularly sodium metaborate produced in the hydrolysis reaction of sodium borohydride, generally takes the form of a hydrate and is often present in the form of a tetrahydrate ($NaBO_2 \cdot 4H_2O$) among hydrates. Even when a hydrate of sodium metaborate is used for the raw material, the reaction of the above chemical formula 7 can be allowed to proceed by performing heating or the like. But, in this case, a dehydration reaction occurs before the hydrogenation reaction, and therefore the reaction time and the energy required for the reaction increase. Therefore, from the viewpoint of production efficiency, the sodium metaborate used for the reaction is preferably an anhydride (anhydrous $NaBO_2$).

Therefore, in the method for producing sodium borohydride in this embodiment, when a hydrate of sodium metaborate is used for the raw material, the drying step S1 is performed before the reaction step S2, and the obtained anhydrous sodium metaborate is used for the reaction, as shown in FIG. 1. Thus, the energy efficiency and the production efficiency in the sodium borohydride production process can be improved. This drying step S1 need not be performed when anhydrous sodium metaborate is used for the raw material.

The conditions of heating temperature, heating time, and the like in the drying step S1 are not particularly limited and can be appropriately set in ranges in which a hydrate of sodium metaborate dehydrates, and anhydrous sodium metaborate is obtained.

<Reaction Step S2>

The reaction represented by the above chemical formula 7 is composed of the reactions of the following chemical formulas 8A and 8B, and when the reaction is not inhibited by an aluminum oxide ($Al_2O_3$) layer, the reaction proceeds at normal temperature. Specifically, first, a plus ion on an aluminum (Al) surface and hydrogen ($H_2$) come into contact with each other to produce protide ($H^-$). In addition, the bond energy between aluminum (Al) and oxygen (O) is higher than the dissociation energy of the B—O bond of sodium metaborate ($NaBO_2$), and therefore the oxygen (O) of sodium metaborate ($NaBO_2$) is extracted by aluminum (Al) as shown in the following chemical formula 8A, and protide ($H^-$) is bonded in place of it as shown in the following chemical formula 8B. Thus, aluminum oxide ($Al_2O_3$) and sodium borohydride ($NaBH_4$) can be produced in an environment of normal temperature and normal pressure.

$$NaBO_2 + 4/3 Al \rightarrow NaB^{4+} + 2/3 Al_2O_3 \quad \text{(A)[Chem. 8]}$$

$$NaB^{4+} + 4H^- \rightarrow NaBH_4 \quad \text{(B)}$$

The reactions represented by the above chemical formula 7 and chemical formula 8 is each an exothermic reaction of 329 kJ/mol, and therefore the reactions proceed even if heat is not externally applied. In addition, the thermodynamic Gibbs free energy value in this reaction is −258 kJ/mol and is a minus value, and therefore it can be expected that the reaction is allowed to proceed under normal temperature and normal pressure.

However, aluminum is usually covered with a thin natural oxide film of about 5 nm, and the reduction reaction of chemical formula 8A does not proceed at normal temperature. Therefore, conventionally, the reaction is allowed to proceed under the conditions of high temperature and high pressure. In this case, in the reaction process, an oxide layer forms on the surface of aluminum, and the film becomes thicker, and therefore this hinders the progress of the reaction. As a result, the unreacted aluminum 4 remains inside the aluminum powder 5 as shown in FIG. 2.

Therefore, in the method for producing sodium borohydride in this embodiment, the reaction is performed while aluminum grains are crushed and rolled and ground with a grinding medium. The rolling and grinding with a grinding medium is continuously performed during the reaction. Thus, the internal aluminum ground metal covered with an oxide layer is sequentially pushed out and exposed in a hydrogen atmosphere, and the conversion reaction represented by the above chemical formula 8 proceeds in the aluminum ground metal portion. This reaction proceeds even at normal temperature, and continues until all sodium metaborate ($NaBO_2$) is converted.

In the method for producing sodium borohydride in this embodiment, the reaction is performed in a hydrogen atmosphere, and therefore the aluminum oxide layer does not grow by a factor other than the reaction with sodium metaborate. Therefore, when this method is used, the thickness of the oxide layer formed on the aluminum surface is relatively thin, and the aluminum bare metal can be exposed with low energy.

[Sodium Metaborate ($NaBO_2$)]

For the sodium metaborate that is a raw material, for example, sodium metaborate produced in the hydrolysis reaction of sodium borohydride can be used. From the viewpoint of production efficiency, the sodium metaborate used in the reaction step S2 is preferably an anhydride. Therefore, when the sodium metaborate that is a raw material is a hydrate, the above-described drying step S1 is preferably performed to provide anhydrous sodium metaborate.

[Aluminum (Al)]

In the method for producing sodium borohydride in this embodiment, granular aluminum is used. The aluminum here also includes, in addition to pure aluminum, aluminum alloys comprising various additive elements in a range that does not inhibit the above-described reaction. The amount of aluminum deposits and the amount of aluminum produced are larger than the amount of magnesium deposits and the amount of magnesium produced, and aluminum is easily available and also has a low price. Further, in the method for producing sodium borohydride in this embodiment, an aluminum waste material can also be used alone or mixed with new aluminum and used, which leads not only to a reduction in production cost but also to the effective utilization of resources.

The shape of the aluminum should be granular, and its size is not particularly limited, but from the viewpoint of handling properties and production cost, one having a particle diameter of 2 to 5 mm is preferably used.

[Grinding Medium]

For the grinding medium used in the reaction step S2, for example, steel spheres can be used, but the material of the grinding medium is not limited to steel materials and should be one that can roll and crush aluminum and aluminum oxide and does not inhibit the hydrogenation reaction of sodium metaborate. In addition, the shape of the grinding medium is also not limited to a spherical shape, and a grinding medium can be appropriately selected from those used in various grinders (mills) such as balls, rods, and rolls, and used. Further, the size of the grinding medium is also not particularly limited, but from the viewpoint of production efficiency improvement, one having a diameter larger than the particle diameter of aluminum is preferably used.

As described in detail above, in the method for producing sodium borohydride in this embodiment, the raw material is reacted while being rolled and ground using the grinding medium, and therefore the bare metal portion can be exposed from the aluminum oxide layer formed on the aluminum surface. Thus, it is possible to suppress reaction inhibition due to oxide layer formation and promote the hydrogenation reaction of sodium metaborate. In addition, the reaction system in the method for producing sodium borohydride in this embodiment is an exothermic reaction and proceeds at normal temperature, and therefore the reaction can be allowed to proceed even without heating at high temperature.

As a result, in the production method in this embodiment, sodium borohydride can be produced from sodium metaborate with a high yield under the condition of a temperature lower than a conventional one. In other words, the method for producing sodium borohydride in this embodiment has better energy efficiency and production efficiency than a conventional production method. By utilizing the method for producing sodium borohydride in this embodiment, a recycle system in which sodium metaborate produced in the hydrolysis of sodium borohydride is recovered and returned to the original sodium borohydride can be realized.

The production of sodium borohydride corresponds to a hydrogen storage step from the viewpoint of the supply of hydrogen, and the obtained sodium borohydride can efficiently store hydrogen and is an excellent hydrogen carrier. In the production method in this embodiment, this sodium borohydride can be produced in a one-stage reaction step, and therefore the energy introduced in the step can be reduced, and the introduced energy can be efficiently used. In addition, aluminum oxide ($Al_2O_3$) that is a by-product can be utilized as a raw material for various aluminum materials, in addition to aluminum refining.

(Second Embodiment)

Figure 3:
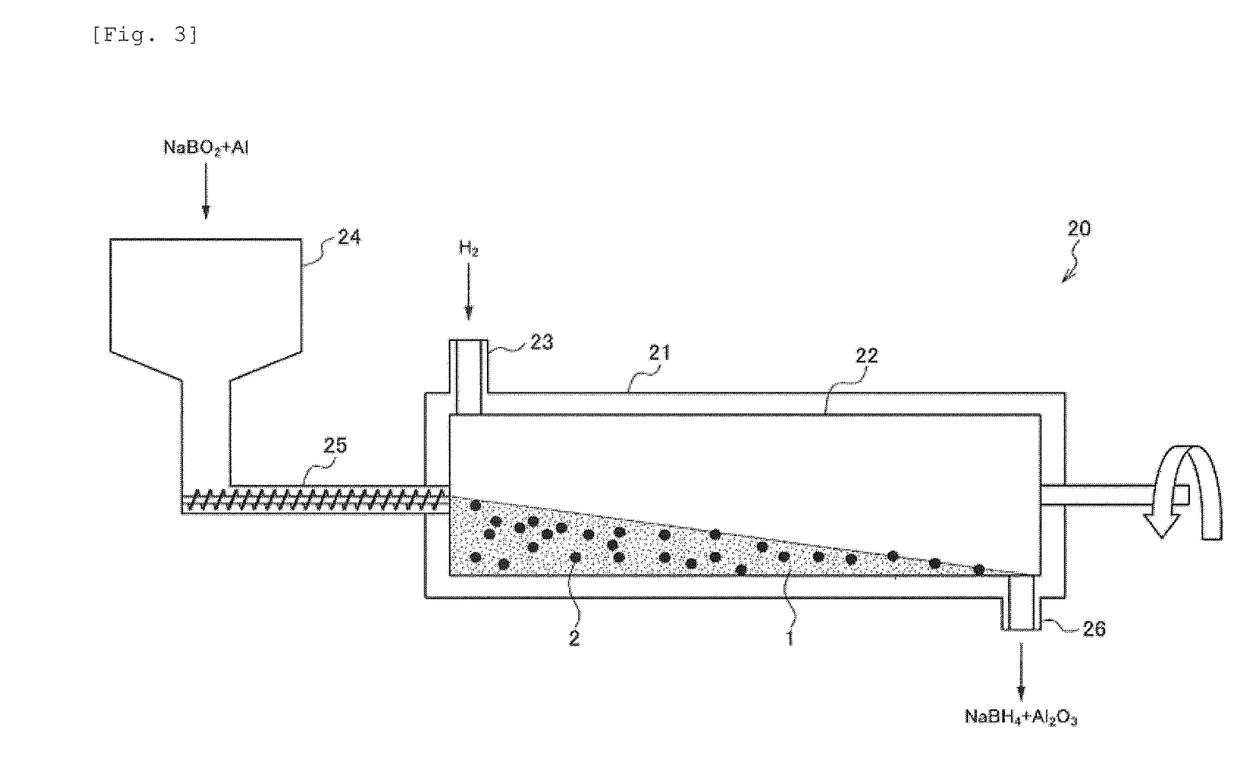
FIG. 3 is a diagram schematically showing the configuration of an apparatus for producing sodium borohydride in the second embodiment of the present invention.

Next, an apparatus for producing sodium borohydride according to the second embodiment of the present invention will be described. FIG. 3 is a diagram schematically showing the configuration of the production apparatus in this embodiment. The production apparatus 20 in this embodiment is used in the method for producing sodium borohydride in the first embodiment described above and comprises a cylindrical reaction container 21, a cylindrical reaction portion 22 rotatably held in the reaction container 21, and a hydrogen introduction portion 23 for introducing hydrogen ($H_2$) gas into the reaction container 21.

[Reaction Container 21]

The reaction container 21 is a cylindrical heat-resistant and pressure-resistant container, and its inside is sealable. The material of the reaction container 21 is not particularly limited, and, for example, the reaction container 21 can be formed of a steel material.

[Reaction Portion 22]

The reaction portion 22 is a bottomed cylindrical body having a smaller diameter than the reaction container and is formed of a metal material that does not influence the hydrogenation reaction of sodium metaborate, like a steel material or the like, and rotatably held in the reaction container. A hole or a slit through which hydrogen gas can pass is preferably provided in the reaction portion 22. As this reaction portion 22, for example, a metal rotary drum can be used. In addition, sodium metaborate that is a raw material and granular aluminum are housed in the reaction portion 22 together with a grinding medium.

[Hydrogen Introduction Portion 23]

The hydrogen introduction portion 23 introduces hydrogen ($H_2$) gas into the reaction container 21 or the reaction portion 22 and is connected to a hydrogen gas storage tank or the like via piping or the like.

[Other Configurations]

In addition to the above-described components, a raw material supply portion and a product recovery portion 26 may be provided in the apparatus for producing sodium borohydride in this embodiment. The raw material supply portion can be composed of, for example, a hopper 24 and a pipe conveyor 25. By continuously supplying sodium metaborate that is a raw material and granular aluminum or a mixture of these from the hopper 24 to the reaction portion 22 via the pipe conveyor 25 and continuously recovering from the product recovery portion 26 sodium borohydride and aluminum oxide produced in the reaction portion 22, sodium borohydride can be continuously produced.

Further, the apparatus for producing sodium borohydride in this embodiment may comprise a dryer (not shown) for drying a hydrate of sodium metaborate to obtain anhydrous sodium metaborate. In addition, by using as the dryer a continuous one and coupling this to the above-described raw material supply portion, anhydrous sodium metaborate obtained by drying with the dryer can be continuously supplied into the reaction portion 22.

[Operation]

Next, a method for producing sodium borohydride using the apparatus 20 for producing sodium borohydride in this embodiment will be described. In the production apparatus 20 in this embodiment, sodium metaborate that is a raw material and granular aluminum are housed in the reaction portion 22 together with a grinding medium. Then, from the hydrogen introduction portion 23, hydrogen gas is introduced into the reaction portion 22 directly or via the reaction container 21. At this time, for example, when a hole or a slit through which hydrogen gas can pass is provided in the reaction portion 22, hydrogen gas is introduced into the reaction container 21 from the hydrogen introduction portion 23, and the hydrogen gas is introduced into the reaction portion 22 from the hole or the slit. In addition, under the reaction condition of low pressure, hydrogen gas may be directly introduced into the reaction portion 22.

After a hydrogen atmosphere is provided in the reaction portion 22, the hydrogenation reaction of sodium metaborate is performed while the reaction portion 22 is rotated to roll and grind granular aluminum in a raw material 1 with a grinding medium 2. Then, sodium borohydride and aluminum oxide produced in the reaction portion 22 are recovered with the rotation stopped after the reaction for a predetermined time, or appropriately recovered while the reaction portion 22 is rotated.

The apparatus for producing sodium borohydride in this embodiment has a dual structure in which the reaction portion is rotatably supported in the reaction container, and the reaction is performed while the reaction portion is rotated. Therefore, the aluminum in the raw material is rolled and ground with the grinding medium, and the bare metal portion on which an oxide layer is not formed can be exposed. In addition, the production apparatus in this embodiment also has the effect of continuously making the raw material finer to increase the surface area. As a result, by using the production apparatus in this embodiment, it is possible to suppress reaction inhibition due to oxide layer formation and promote the hydrogenation reaction of sodium metaborate.

The configurations and effects of the apparatus for producing sodium borohydride in this embodiment other than the above are similar to those of the above-described first embodiment. In addition, the production apparatus in this embodiment can be used not only for the production of sodium borohydride using aluminum but also for the production of sodium borohydride using magnesium, and also in this case, similarly, the reaction-inhibiting factor due to the oxide layer formed on the surface can be avoided.

EXAMPLES

The effects of the present invention will be specifically described below by giving an Example and Comparative Examples.

Comparative Examples 1 to 6

Figure 4:
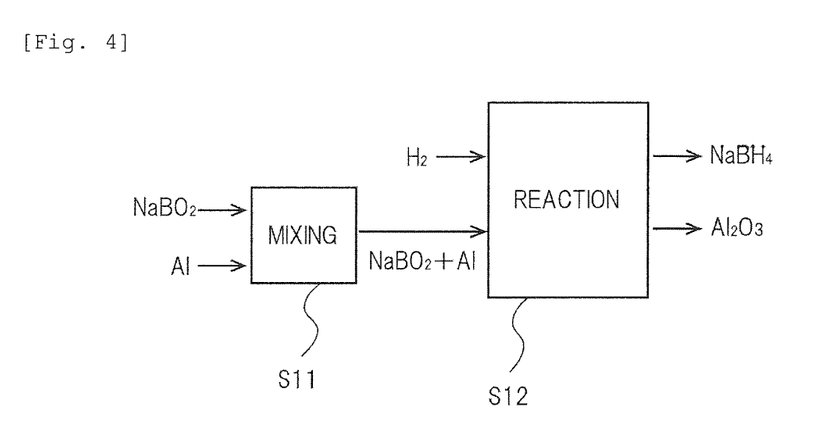
FIG. 4 is a conceptual diagram showing a production method in the Comparative Examples of the present invention.

First, as the Comparative Examples of the present invention, a reaction was performed without rolling and grinding to produce sodium borohydride from sodium metaborate. FIG. 4 is a conceptual diagram showing the production method in Comparative Examples 1 to 6. In Comparative Examples 1 to 6, first, a tetrahydrate of sodium metaborate ($NaBO_2 \cdot 4H_2O$) was dried by a dryer at a temperature of 350° C. for about 3 hours to obtain anhydrous sodium metaborate ($NaBO_2$).

Next, as shown in FIG. 4, this anhydrous sodium metaborate ($NaBO_2$) and an aluminum powder having a particle diameter of about 50 μm were mixed (mixing step S11). A reaction container was charged with this mixture of the anhydrous sodium metaborate and the aluminum powder, and under a hydrogen atmosphere, the hydrogen pressure was held at 5 MPa, and the temperature was held at 550° C. to allow a reaction to proceed (reaction step S12). Then, after about 10 hours from the start, the reaction was completed, and the reaction products (including the unreacted raw material) were removed. The amount of the raw material charged and the conversion rate in Comparative Examples 1 to 6 are shown together in the following Table 1.

TABLE 1

|  | Amount charged (g) | | Reaction time (hours) | Conversion rate (%) |
| --- | --- | --- | --- | --- |
|  | $NaBO_2$ | AL | | |
| Comparative Example 1 | 1.34 | 0.77 | 10 | 70.7 |
| Comparative Example 2 | 1.33 | 0.76 | 10 | 68.6 |
| Comparative Example 3 | 0.75 | 0.43 | 10 | 65.4 |
| Comparative Example 4 | 1.68 | 0.96 | 10 | 54.3 |
| Comparative Example 5 | 1.46 | 0.84 | 10 | 49.6 |
| Comparative Example 6 | 1.34 | 0.40 | 10 | 36.5 |

<Calculation of Conversion Rate>

The conversion rate from sodium metaborate to sodium borohydride in each of the production methods in Comparative Examples 1 to 6 shown in the above Table 1 was calculated by the method shown below. First, the sodium borohydride included in the reaction products was hydrolyzed, and the thus produced hydrogen was determined. The amount of hydrogen was calculated from the amount of water ($H_2O$) produced by reacting the hydrogen generated by the hydrolysis with copper oxide (CuO) as shown in the following chemical formula 9. Then, based on the amount of hydrogen in the case of 100% conversion (hydrogen yield 100%), the amount of hydrogen (hydrogen yield) in each of the reaction products obtained in the Example and the Comparative Examples was obtained, and the value was taken as the conversion rate.

$CuO + H_2 \rightarrow Cu + H_2O$ [Chem. 9]

As shown in the above Table 1, in Comparative Examples 1 to 5, the conversion rate ($H_2$ yield) was 49.6 to 70.7% and was about 60% on average. In addition, in Comparative Example 6, the amount of the aluminum powder charged was about 1/2, and except for this, sodium borohydride was produced under similar conditions. In this case, the yield of hydrogen (conversion rate to sodium borohydride) also decreased to 1/2. From this result, it was confirmed that the conversion rate was proportional to the amount of aluminum contributing to the reaction. From the above, it is considered that in Comparative Examples 1 to 6, an aluminum oxide layer was formed on the surface of the aluminum powder, and unreacted aluminum remained in the central portion, and therefore the conversion rate decreased.

Example 1

Next, as Example 1 of the present invention, sodium borohydride was produced using the production apparatus 20 shown in FIG. 3. Specifically, the reaction portion (rotary drum) 22 rotatably disposed in the cylindrically shaped reaction container 21 was charged with 1.74 kg of anhydrous sodium metaborate ($NaBO_2$) obtained by drying with a method and conditions similar to those in the Comparative Examples described above and 0.96 kg of aluminum grains having a diameter of about 3 mm. Further, steel spheres having a diameter of about 30 mm as a grinding medium were placed in the reaction portion 22. For the reaction portion 22, a metal rotary drum having a hole through which hydrogen gas could pass was used.

Then, hydrogen gas was introduced into the reaction container 21 from the hydrogen introduction portion 23, and the hydrogen pressure was set at 0.5 to 1 MPa, and the temperature was set at 300° C. While the reaction portion 22 was rotated to roll and grind the aluminum grains with the steel spheres, a reaction was allowed to proceed. Then, after about 1 hour from the start, the reaction was completed, and the reaction products (including the unreacted raw material) were removed. Then, using the obtained reaction products, the conversion rate was calculated by a method similar to that in the Comparative Examples described above. As a result, in the production method in Example 1, substantially the total amount of aluminum contributed to the reaction, and a conversion rate of about 95% or more was obtained in a reaction time shorter than that in the Comparative Examples.

From the above results, it was confirmed that by utilizing the method and the apparatus for producing sodium borohydride according to the present invention, sodium borohydride was efficiently produced under the conditions of a temperature and a pressure lower than conventional ones from sodium metaborate produced by the hydrolysis of sodium borohydride.

REFERENCE SIGNS LIST 1 raw material
2 grinding medium
3 aluminum oxide layer
4 unreacted aluminum
5 aluminum powder
20 production apparatus
21 reaction container
22 reaction portion
23 hydrogen introduction portion
24 hopper
25 pipe conveyor
26 product recovery portion
S1 drying step
S2, S12 reaction step
S11 mixing step

The invention claimed is:

1. A method for producing sodium borohydride from sodium metaborate, comprising a step of: reacting anhydrous sodium metaborate (anhydrous $NaBO_2$) and granular aluminum consisting essentially of aluminum under a hydrogen atmosphere, while rolling and grinding the anhydrous sodium metaborate (anhydrous $NaBO_2$) and the granular aluminum using a grinding medium, to obtain sodium borohydride, wherein the mixture comprising the anhydrous sodium metaborate (anhydrous $NaBO_2$) and the granular aluminum.

2. The method for producing sodium borohydride according to claim 1, using an apparatus comprising:
a cylindrical reaction container;
a cylindrical reaction portion which is rotatably held in the reaction container and in which the anhydrous sodium metaborate (anhydrous $NaBO_2$) that is a raw material and the granular aluminum are housed together with the grinding medium, and
a hydrogen introduction portion for introducing hydrogen gas into the reaction portion directly or via the reaction container, wherein
a hydrogenation reaction of the anhydrous sodium metaborate (anhydrous $NaBO_2$) is performed under a hydrogen atmosphere while the reaction portion is rotated to roll and grind the granular aluminum with the grinding medium.

3. The method for producing sodium borohydride according to claim 2, wherein a hole or a slit through which the hydrogen gas can pass is formed in the reaction portion, and the hydrogen gas introduced into the reaction container from the hydrogen introduction portion passes through the hole or the slit and is introduced into the reaction portion.

4. The method for producing sodium borohydride according to claim 2, wherein the apparatus comprises:
a raw material supply portion for supplying a raw material to the reaction portion; and
a product recovery portion for recovering sodium borohydride and aluminum oxide produced in the reaction portion, wherein the sodium borohydride is continuously produced.

5. The method for producing sodium borohydride according to claim 4, wherein the apparatus further comprises:
a dryer for drying a hydrate of sodium metaborate to obtain the anhydrous sodium metaborate (anhydrous $NaBO_2$), wherein the anhydrous sodium metaborate (anhydrous $NaBO_2$) obtained by drying with the dryer is continuously supplied from the raw material supply portion into the reaction portion.

6. The method for producing sodium borohydride according to claim 3, wherein the apparatus comprises:
a raw material supply portion for supplying a raw material to the reaction portion; and a product recovery portion for recovering sodium borohydride and aluminum oxide produced in the reaction portion, wherein the sodium borohydride is continuously produced.

7. The method for producing sodium borohydride according to claim 6, wherein the apparatus further comprises:
a dryer for drying a hydrate of sodium metaborate to obtain the anhydrous sodium metaborate (anhydrous $NaBO_2$), wherein the anhydrous sodium metaborate (anhydrous $NaBO_2$) obtained by drying with the dryer is continuously supplied from the raw material supply portion into the reaction portion.

* * * * *